E. RICE,

Assignor to D. GOFF & SONS.

Tape-Holder.

No. 9,106. Reissued Mar. 2, 1880.

Witnesses:
Philip F. Larner,
Howell Battle

Inventor:
Eliakim Rice
By Wm. G. Mott
Attorney.

N. PETERS, PHOTO-LITHOGRAPHER, WASHINGTON, D. C.

UNITED STATES PATENT OFFICE.

ELIAKIM RICE, OF NANUET, NEW YORK, ASSIGNOR TO D. GOFF & SONS, OF PAWTUCKET, RHODE ISLAND.

TAPE-HOLDER.

SPECIFICATION forming part of Reissued Letters Patent No. 9,106, dated March 2, 1880.

Original No. 201,835, dated March 26, 1878. Application for reissue filed December 30, 1879.

*To all whom it may concern:*

Be it known that I, ELIAKIM RICE, of Nanuet, Rockland county, in the State of New York, formerly of Cazenovia, Madison county, in said State, have invented certain new and useful Improvements in Tape-Holders; and I do hereby declare that the following is a clear, true, and complete description of my invention.

Prior to my application for Letters Patent tape or ribbon holders had been largely used consisting of a bent wire with inwardly-turned ends for engaging either with the central portion of a coil of narrow fabric or with the central opening in the wooden core or spool usually employed with coils of such goods as are susceptible of being put up in coils for the market.

My device considered as a whole differs from all others heretofore known to me, in that it embodies a guard which properly controls the free or outer end of the coil of braid and supports the sides thereof as heretofore, but is centrally united firmly by means of flanged hollow bearings therefor, said guard at each of its ends being so constructed as to embrace said hollow bearings.

The advantage due to this construction is that the guard is not so liable to become detached from the coil of fabric as when the ends of the guard are merely bent inward, and thereby fitted to engage with the interior of the bore of the spool on which the fabric is coiled.

To more particularly describe my invention I will refer to the accompanying drawings, in which—

Figure 1:
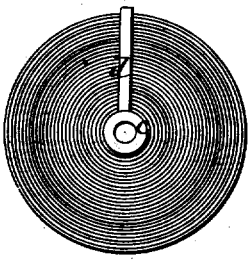
Figure 2:
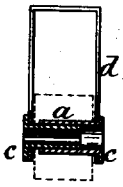
Figure 3:
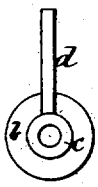
Figure 4:
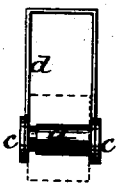
Figure 5:
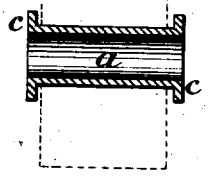
Figure 6:
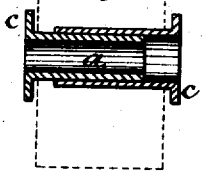

Figure 1 is a side view of a coil of narrow fabric with my holder or guard applied as in use, without the usual central wooden core. Fig. 2 is a diametrical sectional view of the hollow flanged bearings, and with the guard applied thereto, and with the usual wooden core shown in dotted lines. Fig. 3 is an end view of my holder as used with a central wooden core, shown in solid lines. Fig. 4 is a side view of my holder or guard complete, the usual wooden core being shown in dotted lines, as in Fig. 2. Fig. 5 represents, in longitudinal central section, the hollow flanged bearing constructed in one piece of sheet metal, and with the usual wooden core, shown in dotted lines. Fig. 6 is a similar view of the hollow flanged bearings in two pieces, with the usual wooden spool, also shown in dotted lines.

In the drawings, *a* denotes the hollow metallic flanged bearing. When constructed as shown, whether in one piece, as in Fig. 5, or in two pieces, as in Figs. 2, 4, and 6, the flanges *c* are essential.

The guard *d*, made either of wire or flat metal, is bent so as to extend from the center of a coil of fabric, thus affording side support to and across its periphery for controlling the free end of the fabric, as shown; and the ends of the guard have circular openings, which are occupied by the hollow flanged bearing, whether this latter be in one piece or in two, as shown. When the bearing is in two pieces, as in Figs. 2, 4, and 6, the two hollow bearings are respectively inserted from opposite sides of the guard, the flanges *c* thus preventing the ends of the guard from displacement. When the hollow bearing is constructed in one piece, as in Fig. 5, the flanges *c* are turned up after the guard has been placed upon the bearing.

The usual wooden core *b*, used for narrow fabrics, is shown in solid lines in Fig. 3 and in dotted lines in Figs. 2, 4, 5, and 6, said core being provided with the usual central opening or bore.

In Fig. 1 my device is shown applied to a coil of narrow fabric without any wooden core. The hollow flanged metallic bearings or bearing consists of a small metallic spool, in that it is the central foundation on which the coiled narrow fabric is centrally supported.

Having thus described my invention, I claim as new and desire to secure hereby—

1. The combination, substantially as hereinbefore described, in a holder for coiled narrow fabrics, of a guard which supports the sides of the coil and controls the free end of the fabric, provided with circular openings at the ends thereof, and hollow flanged bearings which occupy said circular openings and serve to securely maintain the ends of said guard applied to a coil of narrow fabric, as set forth.

2. The combination, with the side-supporting guard, of a central bearing therefor which is provided with retaining-flanges, substantially as described.

3. The combination of the metallic spool *a*, having a circumferential flange, *c*, at each end, and the guard *d*, having openings at its end to fit loosely on said spool inside of the end flanges, substantially as described.

ELIAKIM RICE.

Witnesses:
DANIEL J. A. BOGERT,
CHARITY H. BOGERT.